United States Patent Office.

ERNST KÖNIG, OF HÖCHST-ON-THE-MAIN, GERMANY, ASSIGNOR TO THE FARBWERKE, VORMALS MEISTER, LUCIUS & BRÜNING, OF SAME PLACE.

COPPERY-BROWN DYE.

SPECIFICATION forming part of Letters Patent No. 602,639, dated April 19, 1898.

Application filed May 6, 1897. Serial No. 635,398. (Specimens.)

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of a Coppery-Brown Dyestuff, of which the following is a specification.

This invention relates to a brown basic trisazo dyestuff which is obtained by the action of diazotized meta-trimethyl ammonium phenyl-azo-meta-toluidin upon chrysoidin.

The reaction is set out in the following equation:

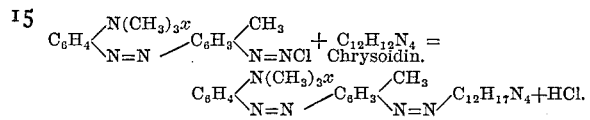

$x$ in this equation means chlorin or an equivalent radical of an acid.

The process is, for instance, as follows: 47.7 kilos of zinc chlorid double salt of meta-trimethyl ammonium phenyl-azo-meta-toluidin hydrochlorid are dissolved in about one thousand liters of water and diazotized at 10° to 15° centigrade by the addition of twenty kilos of hydrochloric acid of 20° Baumé and 6.9 kilos of nitrite of sodium. The solution thus obtained is run into a solution of twenty-five kilos of chrysoidin in about five hundred liters of water, to which are gradually added thirty kilos of acetate of sodium. Upon completion of the reaction the whole is brought to solution by heating, and the dyestuff is separated with common salt.

The dyestuff thus obtained has the following properties: It forms a black-green powder of metallic luster easily soluble in water with a reddish-yellowish-brown color. Neither soda nor soda-lye changes the color of the solution. Hydrochloric acid turns it yellowish brown. It is soluble in concentrated sulfuric acid with a dark-blue color, soluble in alcohol, and insoluble in ether, benzene, or petroleum ether.

The new dyestuff dyes tanned and untanned cotton, as well as half-wool, an even brown in a bath acidified with sulfuric acid.

Having thus described my invention, I claim as new and desire to secure by Letters Patent—

As a new product, the brown dyestuff obtained from diazotized meta-trimethyl ammonium phenyl-azo-meta-toluidin and chrysoidin, being a black-green powder, easily soluble in water with a reddish-yellowish-brown color, soluble in alcohol, insoluble in ether, benzene and petroleum ether, and dyeing tanned and untanned cotton as well as half-wool a coppery brown, substantially as set forth.

In testimony that I claim the foregoing as my invention I have signed my name in presence of two subscribing witnesses.

ERNST KÖNIG.

Witnesses:
HEINRICH HAHN,
ALFRED BRISBIN.